United States Patent
Bågenholm et al.

(10) Patent No.: US 7,923,869 B2
(45) Date of Patent: Apr. 12, 2011

(54) POWER ADAPTER

(75) Inventors: Fredrik Bågenholm, Malmö (SE);
Stefan Sörensson, Södra Sandby (SE);
Idris Omerovic, Malmö (SE); Henrik Heringslack, Malmö (SE)

(73) Assignee: Sony Ericsson Mobile Communications AB, Lund (SE)

( * ) Notice: Subject to any disclaimer, the term of this patent is extended or adjusted under 35 U.S.C. 154(b) by 245 days.

(21) Appl. No.: 12/170,496

(22) Filed: Jul. 10, 2008

(65) Prior Publication Data
US 2009/0184586 A1 Jul. 23, 2009

Related U.S. Application Data

(60) Provisional application No. 61/022,255, filed on Jan. 18, 2008.

(51) Int. Cl.
*H01H 83/00* (2006.01)
*H02H 3/00* (2006.01)
*H02J 7/00* (2006.01)

(52) U.S. Cl. .................. 307/130; 307/125; 307/126

(58) Field of Classification Search .............. 307/125, 307/126, 130
See application file for complete search history.

(56) References Cited

U.S. PATENT DOCUMENTS

| | | | |
|---|---|---|---|
| 6,005,368 A * | 12/1999 | Frame | 320/113 |
| 6,052,291 A * | 4/2000 | Suzuki et al. | 363/21.12 |
| 6,204,637 B1 | 3/2001 | Rengan | |
| 6,339,314 B1 | 1/2002 | Bruning | |
| 6,926,130 B2 * | 8/2005 | Skowronski | 191/12.2 R |
| 7,235,950 B2 * | 6/2007 | Young et al. | 320/134 |

(Continued)

FOREIGN PATENT DOCUMENTS

| | | |
|---|---|---|
| EP | 1 225 675 | 7/2002 |
| EP | 1 643 610 | 4/2006 |

OTHER PUBLICATIONS

International Search Report and Written Opinion for corresponding Application No. PCT/IB2008/002273 dated Feb. 4, 2009.

(Continued)

*Primary Examiner* — Hal I Kaplan
(74) *Attorney, Agent, or Firm* — Renner, Otto, Boisselle & Sklar, LLP

(57) ABSTRACT

A power adapter includes a primary side for receiving power from a mains power supply; a secondary side for providing operating and/or charging power, derived from the primary side, to an electronic device connected to the secondary side; presence logic for determining whether the electronic device is connected to the secondary side; and switching logic for turning off the primary side automatically when the presence logic determines the electronic device is not connected. The power adapter thus shuts itself down if no electronic device is attached, and automatically starts itself up when a device is connected to the power adapter and is thus needed. The power adapter may also include voltage detection logic that detects when the device is fully charged. The power adapter also shuts itself down when an attached electronic device becomes fully charged, and automatically starts itself up when the charged state of the electronic device falls below a predetermined level. While shut down, the power adapter consumes either no power or very little power. The power adapter may wake itself up and provide power to a device even in the event the device itself is without power, such as when the device is turned off and/or has a flat or dead battery.

12 Claims, 2 Drawing Sheets

U.S. PATENT DOCUMENTS

| | | | |
|---|---|---|---|
| 7,250,694 B2 * | 7/2007 | Lin | 307/22 |
| 2004/0056533 A1 | 3/2004 | Chen | |
| 2005/0168189 A1 | 8/2005 | Schweigert | |
| 2006/0220467 A1 | 10/2006 | Lin | |
| 2007/0047270 A1 * | 3/2007 | Makino et al. | 363/34 |

OTHER PUBLICATIONS

International Preliminary Report on Patentability for corresponding Application No. PCT/IB2008/002273 dated Apr. 23, 2010.

* cited by examiner

POWER ADAPTER

RELATED APPLICATION DATA

The present application claims the benefit of U.S. Provisional Application Ser. No. 61/022,255, filed Jan. 18, 2008, the disclosure of which is herein incorporated by reference in its entirety.

TECHNICAL FIELD OF THE INVENTION

The present invention relates to electronic devices, and more particularly to power adapters for powering and/or charging electronic devices.

DESCRIPTION OF THE RELATED ART

Various types of portable electronic devices have been popular for decades and continue to increase in popularity. These portable devices include, but are not limited to, digital telephones, mobile phones, pagers, communicators, cameras, electronic organizers, personal digital assistants (PDAs), smartphones, media players, etc.

Most portable electronic devices operate on battery power. In addition, many portable electronic devices are configured to operate on power from a power adapter. Portable electronic devices that operate on battery power typically include one or more rechargeable batteries. In order to recharge the batteries, the electronic device is coupled to a power adapter suitable for recharging the batteries within the electronic device. In some instances, the batteries are removable from the electronic device and may be coupled directly to the power adapter.

Power adapters suitable for recharging batteries and/or providing operating power to electronic devices typically convert mains power to a DC voltage that in turn charges the batteries and/or powers the electronic device. A primary side of the power adapter plugs into the mains. A secondary side connects to a DC input of the electronic device (or battery) so as to provide power for recharging and/operating the device.

A problem with conventional power adapters is that the power adapters still consume standby power (i.e., reduced power) when attached to the mains, even if the power adapter is not actually in use supplying recharging and/or operating power to a device. Such standby power adds up to a substantial amount of power wasted, particularly in view of the number of power adapters used worldwide.

In view of the aforementioned problems associated with conventional power adapters, there is a strong need for a power adapter that avoids unnecessary consumption of standby power, particularly when not in use.

SUMMARY

The present invention relates to a power adapter for supplying recharging and/or operating power. The power adapter is configured to shut itself down automatically when not in use so as to avoid consuming even standby power despite remaining connected to the mains. In addition, the power adapter is configured to wake itself up automatically when needed to supply recharging and/or operating power. The power adapter shuts itself down if no electronic device (e.g., portable electronic device and/or a battery which itself represents an electronic device) is attached, and automatically starts itself up when a device is connected to the power adapter and is thus needed. The power adapter also shuts itself down when the power adapter detects that a connected device is fully charged. While shut down, the power adapter consumes either no power or very little power (e.g., on the order of simply leakage current). The power adapter may wake itself up and provide power to a device even in the event the device itself is without power (e.g., turned off and/or has a flat (or dead) battery).

According to an aspect of the present invention, a power adapter is provided that includes a primary side for receiving power from a mains power supply; a secondary side for providing operating and/or charging power, derived from the primary side, to an electronic device connected to the secondary side; presence logic for determining whether the electronic device is connected to the secondary side; and switching logic for turning off the primary side automatically when the presence logic determines the electronic device is not connected.

In accordance with one embodiment, the switching logic turns on the primary side automatically when the presence logic determines the electronic device is connected.

According to another embodiment, the power adapter further includes an energy reserve element for providing power to the presence logic.

In yet another embodiment, the power adapter further includes logic for temporarily turning on the primary side to recharge the energy reserve element.

According to another embodiment, the logic for temporarily turning on the primary side includes voltage detection logic for detecting when the voltage of the energy reserve element has dropped below a predetermined level.

In yet another embodiment, the presence logic includes at least one of a mechanical switch, electrical interface or optical switch.

According to still another embodiment, the power adapter further includes logic for automatically turning on the primary side temporarily upon the primary side initially being connected to the mains power supply.

According to still another embodiment, the presence logic comprises a button to be depressed by a user for manually indicating the presence of the electronic device.

According to still another embodiment, the power adapter further comprises voltage detection logic for detecting the charge level of the electronic device, wherein when the voltage detection logic determines that the electronic device is fully charged, the switching logic turns off the primary side.

According to still another embodiment, the switching logic turns off the primary side while the presence logic still determines that the electronic device is connected to the secondary side.

According to still another embodiment, the switching logic automatically turns on the primary side when the voltage detection logic determines that the charge level of the electronic device has fallen below a predetermined level.

According to still another embodiment, the power adapter further comprises a casing containing the primary side and secondary side.

According to still another embodiment, the power adapter further comprises a mains plug for connecting to a mains power source and a device connector for connecting to the electronic device.

According to still another embodiment, the device connector includes a docking station for receiving the electronic device.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

It should be emphasized that the term "comprises/comprising" when used in this specification is taken to specify the presence of stated features, integers, steps or components but does not preclude the presence or addition of one or more other features, integers, steps, components or groups thereof.

DETAILED DESCRIPTION OF EMBODIMENTS

Figure 1:
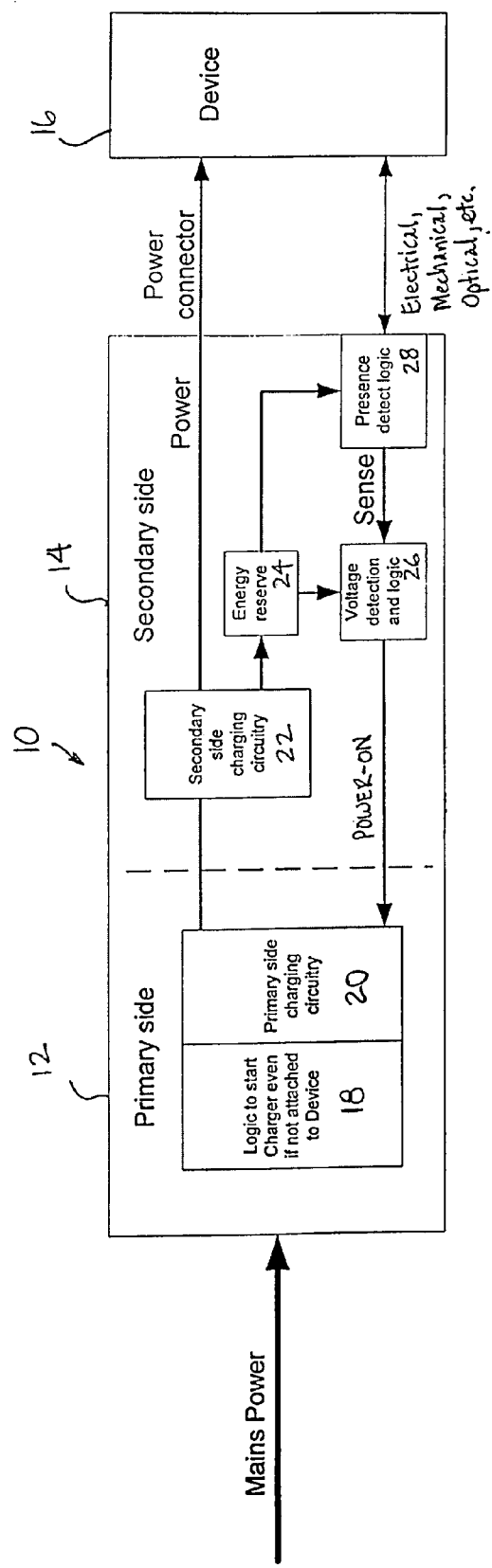
FIG. 1 is a schematic block diagram of a power adapter for powering and/or charging an electronic device in accordance with an exemplary embodiment of the present invention.

The present invention will now be described with reference to the drawings wherein like reference numerals are used to refer to like elements throughout. It will be appreciated that the drawings may not be to scale.

The power adapter of the present invention includes a primary side and a secondary side that shut down automatically when the power adapter is not in use so as to avoid unnecessary consumption of power. As will be explained in more detail below, the power adapter includes a presence detector that detects when the power adapter is connected to an electronic device. When the power adapter is connected to an electronic device, the power adapter operates conventionally so as to provide operating and/or charging power to the electronic device.

If the presence detector does not detect an electronic device coupled to the power adapter, the power adapter shuts down both the primary and secondary sides so as to minimize or even eliminate power consumption even though the power adapter may remain connected to the mains power. Any remaining power consumption is for the most part limited to leakage current and possibly due to a brief restart of the power adapter periodically as will be explained more fully below.

FIG. 1 illustrates a power adapter 10 in accordance with an exemplary embodiment of the present invention. The power adapter 10 includes a primary side 12 that is plugged into or otherwise receives power from a mains power (e.g., via a wall outlet). The power adapter 10 further includes a secondary side 14 galvanically isolated from the primary side 12 and designed to provide operating and/or battery charging power to an electronic device 16. The electronic device 16 may be a mobile phone, media player, camera, PDA, etc., as will be appreciated. Alternatively, the electronic device 16 may simply be the batteries themselves in the case of rechargeable batteries that are removable from a mobile phone, media player, camera, PDA, etc.

While the power adapter 10 is in use, the secondary side 14 is electrically connected to a power input of the electronic device 16 via a power connector (not shown). The power connector may be an electrical cord with a connector at the end designed to plug into the electronic device. In another embodiment, the power connector may take the form of a docking station or some other type of receptacle designed to receive the electronic device 16. The docking station or other type of receptacle includes a connector designed to plug into the electronic device. As will be appreciated, the power adapter 10 may be detachably connected to the device 16 in any of a variety of different ways without departing from the scope of the invention.

Continuing to refer to FIG. 1, the primary side 12 includes start logic 18 and primary side charging circuitry 20 as will be explained in more detail below in association with FIG. 2. When the power adapter 10 is first connected to the mains power (e.g., plugged into a wall socket), the start logic 18 is designed to enable the primary side charging circuitry 20 temporarily for initial operation. The primary side charging circuitry 20 in the exemplary embodiment includes a primary winding. The primary winding is coupled to a secondary winding of a secondary side charging circuitry 22 included in the secondary side 14. During normal operation, power from the mains is transformed from the primary side 12 to the secondary side 14 where it is converted to a DC voltage and subsequently provided to the device 16 via the power connector as is conventional.

The secondary side 14 includes the aforementioned secondary side charging circuitry 22. In addition, the secondary side 14 includes an energy reserve element 24, voltage detection and logic 26, and presence detect logic 28. The energy reserve element 24 is any type of component capable of storing energy for an extended period of time. For example, the energy reserve element 24 may be a capacitor and/or battery. The battery may be rechargeable or replaceable. The energy reserve element 24 provides operating power to the voltage detection and logic 26 and the presence detect logic 28. However, since the voltage detection and logic 26 and the presence detect logic 28 may be constructed using very low power consumption circuitry (e.g., passive CMOS logic), the energy from the energy reserve element 24 is suitably sufficient to power such circuitry for hours, days, weeks, etc. Particularly in an embodiment where the energy reserve element 24 is a capacitor or rechargeable battery capable of being recharged, the energy reserve element 24 preferably is coupled to the output of the secondary side charging circuitry 22 for obtaining power therefrom as will be explained in more detail below.

The presence detect logic 28 includes any of a variety of types of sensors capable of detecting when the power adapter 10 is connected to the electronic device 16. For example, the presence detect logic 28 may include a mechanical switch that is activated when the device 16 is coupled to the power connector of the power adapter 10. In another embodiment, the presence detect logic 28 may include an electrical interface. For example, the presence detect logic 28 may include electrical contacts, pull-up resistors, pull-down resistors, etc. which interact with the like included in the device 16 when the device is coupled to the power connector of the power adapter 10. As yet another option, the presence detect logic 28 may include an optical sensor designed to optically sense when the power connector of the power adapter 10 is connected to the electronic device 16. In each of these embodiments, the presence detect logic 28 will draw little or no current from the energy reserve element 24 when no device is connected. It will be appreciated that the presence detect logic 28 can utilize any of a variety of different sensors without departing from the scope of the invention.

The presence detect logic 28 is configured to output a sense signal to the voltage detection and logic 26. When the electronic device 16 is connected to the power adapter 10, the sense signal from the presence detect logic 28 is active. When the electronic device 16 is not connected to the power adapter 10, the sense signal from the presence detect logic 28 is inactive. The voltage detection and logic 26 is configured such that when the sense signal from the presence detect logic 28 is active, the voltage detection and logic 26 activates a power-on control signal provided to the primary side 18. As will be explained in more detail below with respect to FIG. 2, the power-on control signal being active causes the primary side charging circuitry 20 to turn on and begin supplying power to the secondary side 14 to power and/or recharge the electronic device 16. Conversely, when the power-on control signal is inactive (e.g., due to the electronic device 16 not being connected to the power adapter 10 and the sense signal from the presence detect logic 28 being inactive), the power-on control signal output by the voltage detection and logic 26 is inactive. The power-on control signal being inactive causes the primary side charging circuitry 20 to turn off so as no longer to supply power to the secondary side 14. The line on which the voltage detection and logic 26 provides the power-on control signal to the primary side circuitry 20 preferably includes, but is not limited to, a low-power consumption opto-coupler to maintain electrical isolation between primary side 12 and secondary side 14 as will be appreciated.

The voltage detection and logic 26 also is configured to detect the voltage level of the energy reserve element 24. In the event the voltage of the energy reserve element 24 drops below a predetermined value (e.g., as a result of leakage or drainage current occurring over time), the voltage detection and logic 26 activates the power-on control signal temporarily regardless of the status of the sense signal output by the presence detect logic 28. In this manner, the primary side 12 is turned on and begins to supply the secondary side 14 with power. This in turn enables the secondary side charging circuitry 22 to charge up the energy reserve element 24 back to its intended voltage. Upon detecting that the energy reserve element 24 has been charged back up to its intended voltage, the voltage detection and logic 26 deactivates the power-on control signal thus turning off the primary side 12. Since the voltage detection and logic 26 and the presence detect logic 28 draw little or no current as noted above, the energy reserve element 24 would need to be recharged very seldomly and only for a very brief time as will be appreciated.

Figure 2:
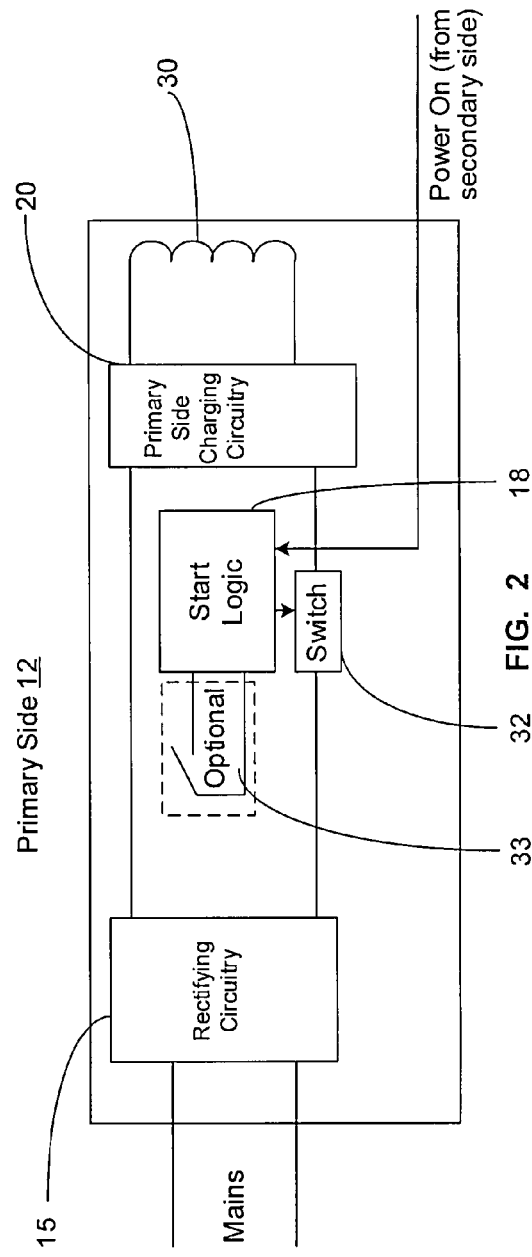
FIG. 2 is detailed schematic diagram of the primary side of the exemplary power adapter of FIG. 1.

Referring now to FIG. 2, the primary side 12 is illustrated in more detail. The primary side includes rectifying circuitry 15 to covert mains power to a DC voltage as is conventional. The power adapter includes conventional switched power supply technology (not specifically shown), whereby the output voltage of the rectifying circuitry 15 is afforded an alternating voltage component which is rectified to a DC voltage on the secondary side. The primary side further includes the primary side charging circuitry 20 as was referenced above. The primary side charging circuitry 20 includes a primary winding 30 as noted above. The primary side also includes a switch 32, which is preferably a solid-state switch that draws very little power in the off state. When the switch 32 is off, no current flows through the primary winding 30 and the primary side 12 is turned off. Conversely, when the switch 32 is turned on current is permitted to flow through the primary winding 30 and power is provided to the secondary side 14 so that operating and/or charging power may be provided to the device 16.

The switch 32 is activated (i.e., turned on) by either a start signal provided by the start logic 18 or the power-on signal from the voltage detection and logic 26. When either the start signal from the start logic 18 or the power-on signal from the voltage detection and logic 26 is active, the switch 32 is on. Thus, the primary side 12 is turned on and power is delivered to the secondary side 14. If neither the start signal from the start logic 18 nor the power-on signal from the voltage detection and logic 26 is active, the switch 32 remains off and thus the primary side 12 and secondary side 14 remain off. Power consumption is thus eliminated for all practical purposes.

The start logic 18 is simply logic that causes a start signal to be provided to the switch 32 temporarily when the power adapter 10 is initially plugged into the mains power after having been unplugged previously. In one embodiment, the start logic may be provided with an optional secondary switch 33 that may be used to manually activate the start logic rather than having the start logic respond automatically to plugging the adapter into the mains power. The start logic permits the primary side 12 to turn on for a sufficient amount of time to enable the secondary side charging circuitry 22 to initially charge the energy reserve element 24 if needed. The start logic 18 may be constructed simply of a resistor-capacitor network designed to provide the start signal to the switch 32 for a predetermined time sufficient to charge the energy reserve element 24 upon first being connected to the mains. Thereafter, the start logic 18 draws very little power if any.

The energy reserve element 24 is particularly advantageous in the event the device 16 is turned off or has a dead battery. In such instance, the device 16 itself does not have its own power to drive the presence detect logic 28 and thus turn on the power adapter 10 upon being connected initially. The energy reserve element 24 provides sufficient operating power for the secondary side logic and voltage detection and logic 26 to enable the power adapter 10 to turn itself on and not be dependent upon power from the electronic device 16 itself in order to do so.

It will therefore be appreciated that the power adapter 10 in accordance with the present invention is capable of turning itself off when disconnected from the electronic device 16, and turning itself on when connected to the electronic device without consuming standby power. If the electronic device 16 is connected to the power connector, the presence detect logic 28 detects such occurrence and prompts the voltage detection and logic 26 to turn on the switch 32 and thereby automatically turn on the primary side 12. If the electronic device 16 is disconnected from the power connector, the presence detect logic 28 detects such occurrence and prompts the voltage detection and logic 26 to turn off the switch 32 and thereby automatically turn off the primary side 12. If the power adapter 10 is initially attached to the mains power, the start logic 18 will cause the switch 32 to turn on temporarily in order to ensure that the energy reserve element 24 is charged. The power adapter 10 will then turn itself off automatically unless connected to the electronic device 16. If the energy stored in the energy reserve element 24 drops below a predetermined level, the voltage detection and logic 26 will automatically turn on the switch 32 briefly such that the energy reserve element 24 may be recharged. Thereafter, the switch 32 is returned to the off position.

Figures 3A, 3B, 3C:
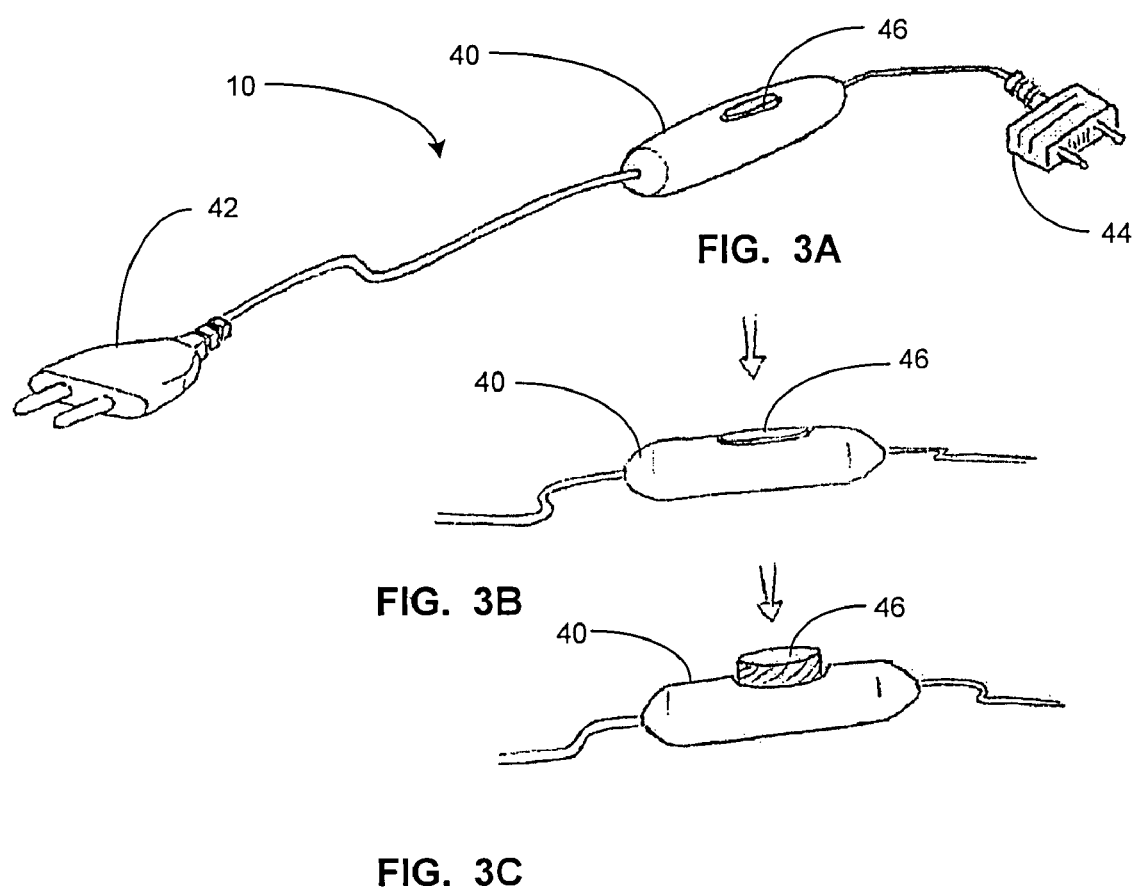
FIG. 3 is a schematic of an exemplary push-button charger configuration of the power adapter of FIG. 1.

FIGS. 3A-3B depict an exemplary construction of the power adapter 10. As depicted in FIG. 3A, in this embodiment the primary side and secondary side (and the components thereof) are housed within a casing 40. The casing 40 may be made of a rigid plastic or comparable material as are commonly used for charging devices. The power adapter is electrically connected to a mains plug 42, which may plug into a mains power source such as a wall outlet or the like. The power adapter 10 also may be electrically connected to a device plug 44, which connects the power adapter to an electronic device to be charged. In one embodiment the device connector may take the form of a docking station or some other type of receptacle designed to receive the electronic device 16. The docking station or other type of receptacle includes a connector designed to plug into the electronic device. As will be appreciated, the power adapter 10 may be detachably connected to the device 16 in any of a variety of different ways without departing from the scope of the invention.

As stated above in connection with FIG. 2, the presence detect logic 28 may detect when the power adapter 10 is connected to an electronic device. In the embodiment of FIGS. 3A-3C, the power adapter is provided with a button 46 that may be manually depressed by a user to indicate that the power adapter has been connected to a device. The button acts as a switch to trigger sensors (mechanical, electrical, or optical as described above) within the presence detect logic to detect the connection of an electronic device. FIG. 3B depicts the power adapter in which the button 46 is depressed to the "on" position. When in such position, the presence detect logic detects that an electronic device is connected, and the power adapter may charge the device in the manner described above. FIG. 3C depicts the power adapter with the button 46 in the "off" position, indicated as being raised above the casing 40 of the power adapter. In such position, the presence detect logic 28 will not detect that a device is connected, and therefore the power adapter will be disconnected from the mains power source.

In one embodiment, the power adapter may also sense when a connected device is fully charged, and the power adapter may then automatically disconnect from the mains power source. In this manner, power is not wasted by attempting to charge a fully charged device. Charging may recommence should the power adapter detect that the charge level of a connected device falls below a predetermined level.

For example, referring again to FIGS. 1 and 2, as stated above the presence detect logic 28 may detect when an electronic device is connected to the power adapter. A sense signal may be transmitted to the voltage detection and logic 26, which in turn transmits a power-on signal to the primary side 12 to initiate charging. The power-on signal results in the closure of the switch 32 on the primary side, so that the charging circuitry 20 becomes active. In this embodiment, the voltage detection and logic 26 may also determine when the electronic device is fully charged. When the electronic device is fully charged, the voltage detection and logic 26 may cease transmitting the power-on signal to the primary side, even if the presence logic 28 still detects that the device is connected. The cessation of the power-on signal results in the deactivation of the switch 32, and the power adapter thus disconnects from the mains power source.

Should the charged state of a connected electronic device fall below a predetermined level, such as by usage while connected or leakage, charging may recommence. The predetermined level, for example, may be seventy-five percent, fifty percent, or some other proportion of full charge. The voltage detection and logic 26 may detect that the charge of the electronic device has fallen below the predetermined level, and recommence sending the power-on signal to the primary side. The power-on signal may reactivate the switch 32 to recommence charging.

Thus, the power adapter of the present invention provides very low power consumption compared to other power adapters that simply enter a reduced-power mode.

The term "electronic device" as referred to herein includes portable radio communication equipment. The term "portable radio communication equipment", also referred to herein as a "mobile radio terminal", includes all equipment such as mobile phones, pagers, communicators, e.g., electronic organizers, personal digital assistants (PDAs), smartphones or the like.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A power adapter, comprising:
a primary side for receiving power from a mains power supply;
a secondary side for providing operating and/or charging power, derived from the primary side, to an electronic device connected to the secondary side;
presence logic for determining whether the electronic device is connected to the secondary side independent of power from the electronic device; switching logic for turning off the primary side automatically when the presence logic determines the electronic device is not connected;
an energy reserve element for providing power to the presence logic; and
logic for temporarily turning on the primary side to recharge the energy reserve element.

2. The power adapter of claim 1, wherein the switching logic turns on the primary side automatically when the presence logic determines the electronic device is connected.

3. The power adapter of claim 1, wherein the logic for temporarily turning on the primary side comprises voltage detection logic for detecting when the voltage of the energy reserve element has dropped below a predetermined level.

4. The power adapter of claim 1, wherein the presence logic comprises at least one of a mechanical switch, electrical interface or optical switch.

5. The power adapter of claim 1, further comprising logic for automatically turning on the primary side temporarily upon the primary side initially being connected to the mains power supply.

6. The power adapter of claim 1, wherein the presence logic comprises a button to be depressed by a user for manually indicating the presence of the electronic device.

7. The power adapter of claim 1, further comprising voltage detection logic for detecting the charge level of the electronic device, wherein when the voltage detection logic determines that the electronic device is fully charged, the switching logic turns off the primary side.

8. The power adapter of claim 7, wherein the switching logic turns off the primary side while the presence logic still determines that the electronic device is connected to the secondary side.

9. The power adapter of claim 7, wherein the switching logic automatically turns on the primary side when the voltage detection logic determines that the charge level of the electronic device has fallen below a predetermined level.

10. The power adapter of claim 1, further comprising a casing containing the primary side and secondary side.

11. The power adapter of claim 10, further comprising a mains plug for connecting to a mains power source and a device connector for connecting to the electronic device.

12. The power adapter of claim 11, wherein the device connector includes a docking station for receiving the electronic device.

* * * * *